(12) United States Patent
Destraves et al.

(10) Patent No.: US 9,754,138 B2
(45) Date of Patent: Sep. 5, 2017

(54) SYSTEM FOR THE DYNAMIC READING OF DATA FROM TRANSPONDERS

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Julien Destraves, Clermont-Ferrand (FR); Maxime Urbin-Choffray, Clermont-Ferrand (FR); Pierre Voissier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 15/039,985

(22) PCT Filed: Nov. 26, 2014

(86) PCT No.: PCT/EP2014/075666
§ 371 (c)(1),
(2) Date: May 27, 2016

(87) PCT Pub. No.: WO2015/078912
PCT Pub. Date: Jun. 4, 2015

(65) Prior Publication Data
US 2016/0379020 A1    Dec. 29, 2016

(30) Foreign Application Priority Data
Nov. 27, 2013   (FR) ..................................... 13 61687

(51) Int. Cl.
*G06K 7/00* (2006.01)
*G06K 7/10* (2006.01)

(52) U.S. Cl.
CPC ..... *G06K 7/10128* (2013.01); *G06K 7/10346* (2013.01); *G06K 7/10356* (2013.01)

(58) Field of Classification Search
CPC .......... G06K 7/00; G06K 19/00; G06F 17/00; G08B 13/14; B60R 25/10
(Continued)

(56) References Cited

U.S. PATENT DOCUMENTS

| 5,083,306 A | 1/1992 | Steffel .............................. 378/61 |
| 6,062,072 A | 5/2000 | Mock et al. ................. 73/146.5 |

(Continued)

FOREIGN PATENT DOCUMENTS

| EP | 1 684 209 A2 | 7/2006 |
| EP | 1 793 326 A2 | 6/2007 |

(Continued)

OTHER PUBLICATIONS

International Search Report dated Jan. 9, 2015, issued by WIPO in connection with International Application No. PCT/EP2014/075666.

*Primary Examiner* — Edwyn Labaze
(74) *Attorney, Agent, or Firm* — Fitzpatrick, Cella, Harper & Scinto

(57) ABSTRACT

A system is provided for dynamically reading data from a tire transponder that includes a linear-polarization antenna. The system includes one ore more system antennas and one or more readers. Each system antenna is able to receive data transmitted by the tire transponder. Each reader is able to couple to the one or more antennas to read and store the data from the tire transponder. Each system antenna is a linear-polarization antenna with a vertical electric field.

9 Claims, 2 Drawing Sheets

(58) Field of Classification Search
USPC .......... 235/439, 375, 487; 340/572.1, 426.3
See application file for complete search history.

(56) References Cited

U.S. PATENT DOCUMENTS

| | | |
|---|---|---|
| 6,252,498 B1 | 6/2001 | Pashayan, Jr. ................ 340/447 |
| 2002/0073771 A1 | 6/2002 | Katou ............................ 73/146 |
| 2004/0135675 A1 | 7/2004 | Thiesen et al. .............. 340/10.1 |
| 2005/0087593 A1* | 4/2005 | Benedict ............ B60C 23/0493 |
| | | 235/375 |
| 2005/0229691 A1 | 10/2005 | Shaw et al. ..................... 73/146 |
| 2007/0103285 A1* | 5/2007 | Konno ................... B60C 19/00 |
| | | 340/447 |
| 2007/0268140 A1 | 11/2007 | Tang et al. ................. 340/572.4 |
| 2007/0277602 A1 | 12/2007 | Heise et al. ................. 73/146.5 |
| 2012/0211997 A1 | 8/2012 | Bonisoli et al. ............. 290/1 R |
| 2012/0291936 A1* | 11/2012 | Lionetti ............. B60C 23/0493 |
| | | 152/539 |
| 2013/0120197 A1* | 5/2013 | Lin ......................... H01Q 1/38 |
| | | 343/700 MS |
| 2015/0183279 A1 | 7/2015 | Okada et al. ....... B60C 23/0408 |

FOREIGN PATENT DOCUMENTS

| | | |
|---|---|---|
| EP | 2 202 099 A1 | 6/2010 |
| FR | 2 941 077 A1 | 7/2010 |
| JP | 2008-140217 A | 6/2008 |
| WO | WO 2007/145148 A1 | 12/2007 |

\* cited by examiner

SYSTEM FOR THE DYNAMIC READING OF DATA FROM TRANSPONDERS

FIELD OF THE INVENTION

The present invention relates to a system for the dynamic reading of data recorded in a transponder of a tire, in particular to identify the tire automatically when it passes near to the system.

PRIOR ART

Document EP 2 202 099 A1 presents a system for the dynamic reading of data from a transponder having a linear-polarisation antenna of a tire of a vehicle. This system combines an antenna capable of receiving data transmitted by the transponder and a reader coupled to the antenna capable of reading and storing the data from the transponders. This system uses a circular-polarisation antenna.

This system is used, in particular, to identify automatically the serial numbers of the tires of a competition vehicle when this vehicle passes along a portal positioned, for example, at the entrance to the circuit. The serial numbers of the tires are recorded in the memory of transponders positioned on the surface or in the structure of the tires.

However, it should be noted that this system does not allow a robust reading of the data from the transponders. Reading is in fact almost impossible, whatever the speed of displacement of the vehicle, in certain relative positions of the system and of the transponder of the tire.

BRIEF DESCRIPTION OF THE INVENTION

The subject of the invention is a system for the dynamic reading of data from a transponder of a tire of a vehicle comprising at least one antenna able to receive data transmitted by the transponder and at least one reader coupled to the said antenna able to read and store the data from the transponder. This system is characterized in that the antenna is a linear-polarization antenna with a vertical electric field.

The fact of using an antenna having linear rather than circular polarisation as previously for the system antenna offers the advantage of giving a gain of 3 dB for the reading power when the system antenna is aligned with the transponder antenna. The choice of a vertical electrical field also offers the advantage of more or less eliminating reverberation phenomena of the waves against the ground.

This results in a very significant improvement in the robustness of the reading of the data recorded in the tire transponders by the system.

The system antenna preferably has a gain equal to or less than 6 dBi.

By way of example, in Europe, the conducted power on the antenna terminals may be equal to or less than 29.15 dBm. As the antenna gain will be 6 dBi, the total power radiated by such an antenna is equal to or less than 35.15 dB (2 W ERP), which is compatible with European standards.

By way of example, in the USA, an antenna with a gain of 6 dBi and a maximum conducted power of 30 dBm can be used in order to comply with the standards. The maximum radiated power is thus 36 dB (4 W EIRP).

Advantageously, the reading system according to one of the subjects of the invention comprises at least two linear-polarization antennas with a vertical electric field which are offset relative to one another in the direction of rolling of the tire by a distance of less than 1.20 meters and preferably of the order of 1 meter.

It is found experimentally that an antenna such as described previously can communicate continuously over a distance of displacement of the tire in the direction normal to the direction of the antenna of the order of a meter at least, having regard to the maximum driving speed of the vehicle of the order of 50 to 60 km/h and of the reader interrogation cycle. The presence of two adjacent antennas therefore guarantees that there is at least one ideal reading position for a tire with a perimeter likewise of the order of two meters and usually at least two ideal reading positions.

The reading positions are ideal when the two antennas of the transponder of the tire and of the reading system have the same orientation, that is to say that the antenna of the transponder of the tire is aligned vertically.

Preferably, the two antennas are disposed at a height in relation to the travel ground which is substantially equal to the height of the axis of rotation of the tire.

According to an advantageous embodiment, the two antennas are operated alternately.

This mode of operation makes it possible to avoid interference between the two antennas. Such interference could occur were the two antennas to function at the same time and with a frequency gap of less than 2 MHz.

Preferably, the two antennas are linked to one and the same reader.

This simple embodiment guarantees that there will be no interference between the two antennas.

According to an advantageous embodiment, the transponder of the tire is a UHF RFID in which a unique identification number of the tire is registered.

The subject-matter of the invention is also a portal for the dynamic reading of data from transponders of vehicle tires, disposed along a travel path of the vehicles, characterized in that it comprises a reading system as previously described on either side of said travel path.

The invention relates in particular to tires intended to be fitted to passenger vehicles, SUVs ("Sport Utility Vehicles"), two-wheeled vehicles (in particular motorcycles), aircraft, and also industrial vehicles including vans, "HGVs", i.e. metro trains, buses, road transport vehicles (trucks, tractors, trailers), off-road vehicles such as agricultural or civil engineering vehicles, other transport or maintenance vehicles.

Definitions

The power of transponder reading systems must comply with precise standards in the different parts of the world.

The power radiated by a reading system+antenna corresponds to the total power radiated in the area. An isotropic antenna is used as a calculation reference, wherein an isotropic antenna is understood to mean a spherical or isotropic antenna.

All real antennas are directional to varying degrees and thus have a greater power density in their main direction compared with a (hypothetical) isotropic antenna. The concept of EIRP (equivalent isotropic radiated power) has been introduced in order to allow different antennas to be compared with one another. This concept represents the effective power that must be applied to an isotropic antenna in order to supply the same power density in the direction of the main beam of the antenna. The following applies:

$$EIRP = P_0 \times G_i$$

Where $P_0$ is the transmitted power and $G_i$ is the gain of the antenna.

The equivalent radiated power, taking that of a half-wave dipole antenna as a reference, also referred to as "ERP" (effective radiated power), is also commonly used.

The following then applies:

$$ERP = P_0 + G_d = P_0 + \frac{G_i}{1.64}$$

Where $G_d$ is the gain of an equivalent dipole antenna.

DESCRIPTION OF THE FIGURES

The attached figures illustrate a portal for the dynamic reading of data from vehicle transponders in the case of automobile competition vehicles which require a reading at a high speed in the region of 50 to 60 km/h.

EXAMPLE EMBODIMENTS OF THE INVENTION

Figure 1:
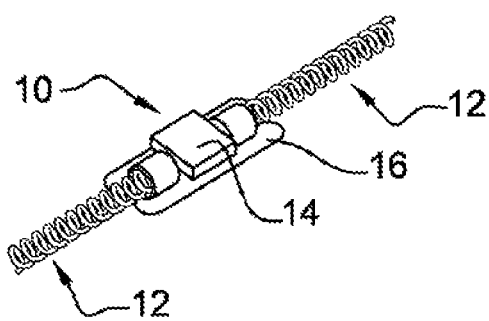
FIG. 1 shows an example of an RFID UHF transponder.
Figure 2:
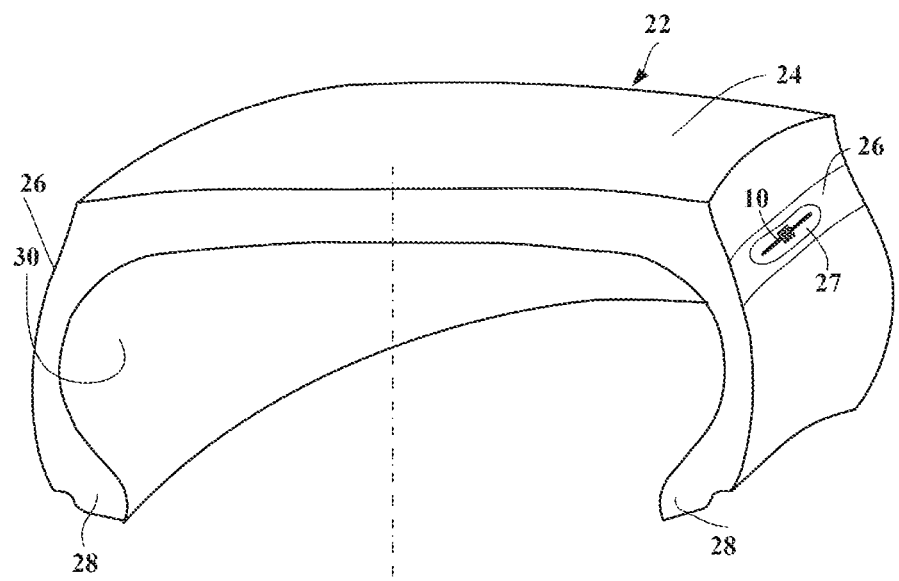
FIG. 2 shows in perspective a partial section of a tire comprising a transponder on its surface.

FIG. 1 shows an example of a transponder, a passive radio-frequency identification transponder 10, fitted with two antennas 12 forming a dipole. This type of transponder is generally referred to by the acronym RFID. A transponder of this type comprises a unique identification number of the tire, stored in a memory. It may also comprise other data relating, for example, to the tire manufacture or type. The transponder 10 is an RFID UHF transponder, operating in a frequency range between 850 and 950 MHz. It includes a chip 14 attached to a carrier 16 and connected to two antennas 12 having a more or less helical shape. The transponder 10 may be positioned inside the structure of a tire 22 during its manufacture or may be attached to its outer surface during an operation subsequent to the curing of the tire, as shown in FIG. 2. The tire 22 is shown highly schematically. It comprises a tread 24, two sidewalls 26, two beads 28, an inner lining 30 and is mounted on a wheel 32. A transponder 10 is attached to the outer surface of the sidewall 26 by means of a rubber patch 27.

The RFID UHF transponder 10 shown comprises a memory and a circuit for transmitting the data stored in the memory to an external reader. The transponder may be active, but is normally passive, and receives RF signals from an external source which transmit to it, in particular, the energy necessary for triggering multiple transmissions of the data contained in the transponder memory. A unique identification number of the tire is allocated by the tire manufacturer either during production or subsequently. This number allows the tire to be tracked throughout its entire service life. This number may follow the recommended "electronic product code" (EPC) format, or may have any other format.

Figure 3:
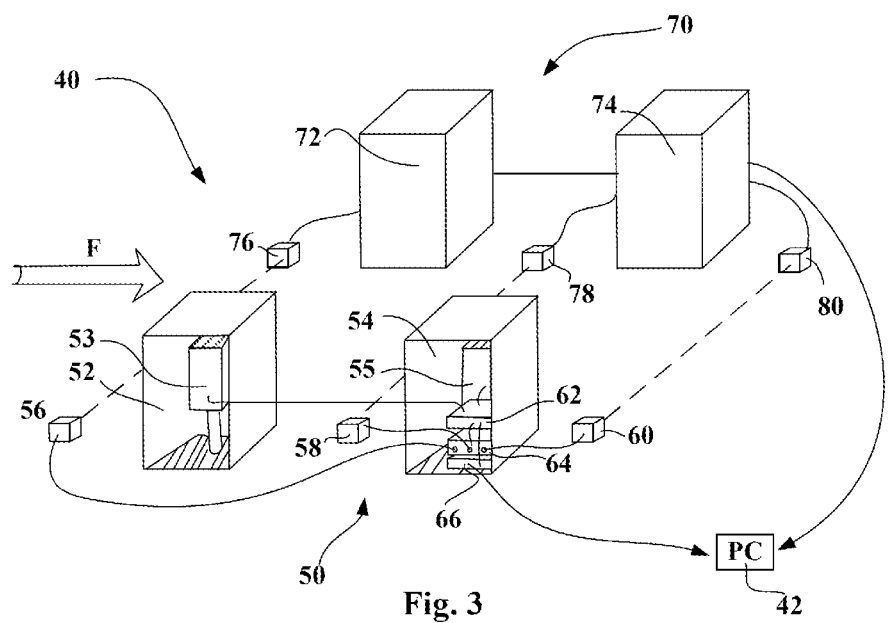
FIG. 3 shows a schematic view of a data reading system.

FIG. 3 shows schematically a portal for the dynamic reading of data 40 according to one subject-matter of the invention. This portal 40 is made up of two identical systems 50 and 70, each disposed on one side of a travel track of a vehicle. The arrow F indicates the direction of travel of the vehicle. Each system as shown includes two housings 52 and 54 on one side, 72 and 74 on the other side, and three associated passage sensors 56 and 76 (D1), 58 and 78 (D2), and also 60 and 80 (D3). The system 40 also comprises a computer or PC 42 intended to receive and process the data.

Each housing comprises an antenna 53, 55 to transmit and receive RF signals to and from the vehicle tire transponders. The housings are made from a material which does not interfere with the RF signals, such as polypropylene. The antennas are directional and their greatest transmission/reception direction is oriented towards the vehicle and perpendicular to the direction of movement of the vehicle.

The housings 54 and 74 furthermore comprise a controllable switch 62, a programmable logic controller 64 and an RFID UHF reader 66.

Figure 4:
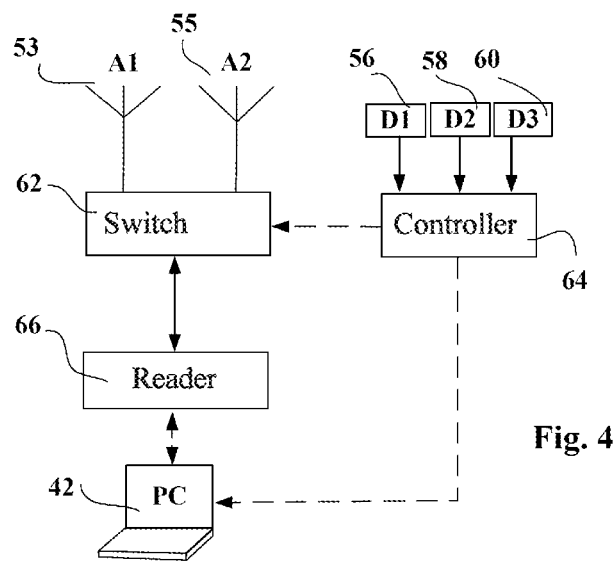
FIG. 4 illustrates schematically the operation of the data reading system.

In the case of the system 50, see FIG. 4, the reader 66 is capable of being coupled to the antennas 53 and 55 in order to read and store the data from the transponders; it is a conventional, commercially available RFID reader-interrogator; the controllable switch 62 is connected to the two antennas 53 and 55 on one side, and to the programmable logic controller 64 on the other side; its role is to provide a selective coupling between the reader 66 and each of the antennas 53 and 55; the switching speed of the switch 62 is less than 50 µs, in the region of 10 µs; the programmable logic controller 64 is connected to the switch 62 on one side and to the three pairs of tire passage sensors 56 and 76 (D1), 58 and 78 (D2), 60 and 80 (D3) on the other side; its role is to control the switch 62 as a function of the signals from these tire passage sensors 56 and 76 (D1), 58 and 78 (D2), 60 and 80 (D3). The reader 66 and the controller 64 are also connected to the computer or PC 42 in order to transmit to it the data that have been read and also the succession of events noted by the controller.

Each pair of passage sensors is disposed on the travel track upstream or downstream of an antenna. These sensors may be of any type, for example with optical, laser, infrared, etc., beams; the passage of a tire is then linked to the interruption of the light signal in the case of an optical sensor or is linked to the excess pressure due to the passage of the tire in the case of a piezoelectric pressure sensor. The distance, in the direction of travel of the vehicle, between the first pair of sensors D1 and the axis of the first antenna is in the region of half the effective reading length of this first antenna. The second pair of sensors D2 is positioned more or less in the middle of the two antennas. Finally, the third pair of sensors is positioned downstream of the second antenna at a distance in the region of half the effective reading distance of the second antenna. Since this effective reading length of each antenna is in the region of one meter, in the system 40, the sensors are disposed, in the direction of travel of the vehicle, at around 50 cm on either side of each antenna. The sensors upstream of each of the antennas serve to indicate the arrival in the reading field of the antenna downstream of a tire, the third pair of sensors serves to indicate the end of the passage of a tire, i.e. the exit of this tire from the reading system. The third pair of sensors can also be replaced by a device which shuts off beyond a given time. The response time of the passage sensors is in the region of one microsecond.

The effective reading distance is, in particular, a function of the antenna types, the parameterisation of the readers, the types of transponders and tires used, and also depends on the passage speed of the vehicles. This distance may be estimated experimentally and corresponds to the distance within which the conditions for reading the data from a transponder associated with a tire are robust and reliable.

The optical sensor beams are positioned at a minimum distance from the travel ground. This distance is preferably less than 3 cm, in the region of 1 to 2 cm. This prevents interference from the vehicle bodywork.

Each antenna is positioned at a distance of between 0.80 and 1.20 meters from the sidewall of the vehicle tires of which the transponders must be read during the passage of the vehicle. Each antenna is also positioned vertically in such a way that its centre is level with the axis of rotation of the vehicle tires in order to ensure good reading conditions when the transponder antenna and the system antenna are both vertically aligned.

Each antenna of the housings 52, 54, 72, 74 is a linear polarisation antenna with a vertical electrical field. This allows the maximum reading power to be used when the transponder antenna and the system antenna are both vertically aligned; this also minimises the reverberations of the RF waves or signals between the antennas of the system and of the transponders against the ground.

The application shown comprises a stringent requirement, i.e. that of being able to read the data from the transponders when the vehicles pass along the system at a maximum speed in the region of 50 to 60 km/h. This means that the vehicle covers a distance of 14 to 17 mm in 1 ms.

The use of passage sensors with a response time in the region of one us and a controllable switch with a switching time of less than 50 μs enables the immediate instigation of the reading of the first antenna and the very fast switching from the first to the second antenna when the second sensor indicates the arrival of the tire in front of this second antenna. Response time variations of the different commercially available readers therefore have no effect. Moreover, this system ensures that the two antennas are in fact controlled alternately, thereby eliminating any risk of interference between the measurements.

The operation of the portal according to one subject-matter of the invention is as follows:

When a vehicle appears in front of the portal 40 in the direction indicated by the arrow F, the front tires cause the triggering of the first barrier of sensors D1, denoted 56 and 76.

This triggering is transmitted to the logic controller 64 which immediately activates the reader 66 and, via the switch 62, the antennas A1 of the housings 52 (denoted 53) and 72. These antennas interrogate the transponders of the two front tires of the vehicle and collect and store the data by these transponders.

When the front tires cause the triggering of the second barrier of sensors D2, denoted 58 and 78, this signal is transmitted to the controller which instructs the switch 62 to switch the reader 66 of first antennas A1 (53) to the second antennas A2 of the housings 54 (denoted 55) and 74. These second antennas interrogate the transponders of the two front tires of the vehicle and collect and store the data transmitted by these transponders.

The switching speed is such (in the order of 10 μs) that the reading and recording of the data transmitted by the transponders is more or less continuous from the first antennas to the second antennas.

The triggering of the third barrier of sensors D3 (denoted 60 and 80) indicates that the front tires of the vehicle have left the effective reading area of the antennas of the portal. This signal is transmitted to the controller which puts the reader 66 on standby.

The reader 66 can then transmit all of the recorded data to the PC 42 for validation and processing.

However, when the wheelbase of the vehicle is such that the rear tires of the vehicle cause the triggering of the first barrier of sensors D1 before the front tires cause the triggering of the third barrier of sensors D3, the controller retains the assignment of the reader 66 to the second antennas A2 until the actual triggering of the third barrier of sensors D3. This allows a complete reading of the front tires of the vehicle. As soon as the third barrier of sensors is triggered, the controller instructs the switch 62 to activate the first antennas A1.

It may thus occur that the front tires of a second vehicle cause the first barrier of sensors D1 to trigger before the rear tires of the first vehicle have caused the triggering of the third barrier of sensors D3. In this case, the controller acts as previously by retaining the assignment of the reader 66 to the second antennas A2 until the third barrier of sensors D3 is triggered.

In order to facilitate the assignment of the data transmitted by the transponders, it is advantageous to add a transponder to the bodywork of the vehicle, for example close to the rear tire. The data from this transponder may also be read by the antennas A1 and A2.

A system as previously described has been implemented. This system consisted of an Impinj reader, set to a maximum conducted power of 30 dBm, two Intermec linear antennas, spaced 1 m apart from one another and vertically oriented, three Banner infrared detection cells, with a transmitter and receiver on the opposite side of the travel track, two disposed 50 cm in front of their associated antenna and the third 50 cm after the second antenna, a Keon controllable switch with four outputs (three used) and a laboratory-produced electronic card to control the switch made up of a PIC microcontroller and inputs/outputs. The tested tires were equipped with SpeedyPatch supplied by Patch Rubber and RFID UHF transponders available from Hanna.

The portal and the systems for the dynamic reading of data from transponders have been described in the particular case of competition vehicles, where the portal is then positioned, for example, in front of the entrance of the competition circuit or at the exit of the stands. A portal of this type can be adapted to all types of vehicles and tires.

The invention claimed is:

1. A system for dynamically reading data from a transponder of a tire of a vehicle, the system comprising:
   at least one system antenna able to receive data transmitted by the transponder; and
   at least one reader able to couple to the at least one system antenna to read and store the data from the transponder, wherein each system antenna is a linear-polarization antenna with a vertical electric field.

2. The reading system according to claim 1, wherein each system antenna has a gain equal to or less than 6 dBi.

3. The reading system according to claim 2, wherein, a maximum power that may be conducted through each system antenna is 30 dBm.

4. The reading system according to claim 1, wherein the transponder is a UHF RFID transponder in which is registered a unique identification number of the tire.

5. A system for dynamically reading data from a transponder of a tire of a vehicle, the system comprising:
   at least two system antennas able to receive data transmitted by the transponder, the system antennas being linear-polarization antennas with a vertical electric field, the linear-polarization antennas being offset relative to one another in a direction of rolling of the tire by a distance of less than 1.20 m; and
   at least one reader able to couple to the system antennas to read and store the data from the transponder.

6. The reading system according to claim 5, wherein the linear-polarization antennas are disposed substantially at a height of an axis of rotation of the tire.

7. The reading system according to claim 5, wherein the linear-polarization antennas are operated alternately.

8. The reading system according to claim 5, wherein the linear-polarization antennas are linked to a same reader of the at least one reader.

9. A portal for obtaining data from vehicles, the portal comprising a reading system for dynamically reading data from transponders of the vehicles, the reading system including:
- at least one system antenna able to receive, for each vehicle of the vehicles, data transmitted by a transponder of the vehicle; and
- at least one reader able to couple to the at least one system antenna to read and store the data from the transponder of the vehicle,
- wherein each system antenna is a linear-polarization antenna with a vertical electric field,
- wherein the reading system is disposed along a travel path of the vehicles, and
- wherein the reading system is positioned on a first side or a second side of the travel path.

* * * * *

UNITED STATES PATENT AND TRADEMARK OFFICE
CERTIFICATE OF CORRECTION

| | |
|---|---|
| PATENT NO. | : 9,754,138 B2 |
| APPLICATION NO. | : 15/039985 |
| DATED | : September 5, 2017 |
| INVENTOR(S) | : Julien Destraves et al. |

It is certified that error appears in the above-identified patent and that said Letters Patent is hereby corrected as shown below:

In the Specification

Column 5:

Line 24, "one us" should read --µs--.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*